(12) United States Patent
Shin

(10) Patent No.: US 6,567,563 B2
(45) Date of Patent: *May 20, 2003

(54) VIDEO IMAGE SEARCHING METHOD AND APPARATUS

(75) Inventor: Hyun-Doo Shin, Sungnam (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,073

(22) Filed: Sep. 22, 1998

(65) Prior Publication Data

US 2002/0150301 A1 Oct. 17, 2002

(30) Foreign Application Priority Data

Dec. 29, 1997 (KR) .............................. 97-76417

(51) Int. Cl.⁷ ................................. G06K 9/36
(52) U.S. Cl. ................... 382/249; 375/240.25
(58) Field of Search ................. 382/249, 305, 382/248, 276, 277–282; 358/453, 449, 451–452; 707/3, 4, 102, 104; 348/403.1–410.1, 393.1–398.1; 375/240.25

(56) References Cited

U.S. PATENT DOCUMENTS

| | | | |
|---|---|---|---|
| 4,941,193 A | * 7/1990 | Barnsley et al. | 382/249 |
| 5,165,103 A | * 11/1992 | Takeda et al. | 382/305 |
| 5,347,600 A | * 9/1994 | Barnsley et al. | 382/249 |
| 5,553,277 A | * 9/1996 | Hirano et al. | 707/104 |
| 5,761,655 A | * 6/1998 | Hoffman | 707/4 |
| 5,862,263 A | 1/1999 | Kim et al. | |
| 6,005,679 A | * 12/1999 | Haneda | 358/453 |
| 6,266,451 B1 | * 7/2001 | Charrier et al. | 382/249 |

FOREIGN PATENT DOCUMENTS

| | | |
|---|---|---|
| JP | 63-286974 | 11/1988 |
| JP | 7-322255 | 12/1995 |

OTHER PUBLICATIONS

Menon "Content based image display from image daabases using spatio–temporal transfers and fractal analysis methods" Image Processing, Sep. 1996. Proc., International Conference on, vol. 3, pp. 863–866.*

Julie et al. "Digital Image indexing and retrieval by content using teh fractal transform for multimedia databases" Proc. IEEE international Forum on research and Technology Advances in Digital Libraries, May 1997 p. 2–12.*

Marie–Julie, JM&ESSAFI,H "Image Database Indexing and Retrieval Using the Fractal Transform" Lecture Notes in Computer Science, vol. 1242, pp. 169–182, 1997 (Hei 9–6–10, JICST).

Vrscay, Edward R., "A Hitchhiker's Guide to "Fractal–Based" Function Approximation and Image Compression", Department of Applied Mathematics, University of Waterloo, Ontario, Canada, pp. 1–20.

Kominek, John, "Advances in Fractal Compression for Multimedia Applications", Department of Computer Science, University of Waterloo, Ontario, Canada, pp. B1–B32.

* cited by examiner

*Primary Examiner*—Jingge Wu
(74) *Attorney, Agent, or Firm*—Staas & Halsey LLP

(57) ABSTRACT

A video image searching method and apparatus that partially restores a picture according to a determined image restoring ratio, in order to reduce the searching time required compared to complete restoration of the picture as in conventional video image search. In the image searching method and apparatus, a dominant image element is extracted using a fractal image compression method, so that the image is partially restored, to thereby effectively search for the video image.

11 Claims, 3 Drawing Sheets ly, objects of the invention are achieved by a
VIDEO IMAGE SEARCHING METHOD AND APPARATUS

CROSS-REFERENCE TO RELATED APPLICATIONS

This application claims the benefit of Korean Application No. 97-76417, filed Dec. 29, 1997 in the Korean Patent Office, the disclosure of which is incorporated herein by reference.

BACKGROUND OF THE INVENTION

1. Field of the Invention

The present invention relates to a video image searching method and apparatus, and more particularly, to a video image searching method and apparatus in which a dominant image element is extracted by a fractal video image compression method and the video image is partially restored.

2. Description of the Related Art

In a fractal video image compression method that assumes a video image is comprised of fixed points of various equations, a target video image is divided into non-overlapping range blocks. In addition, the target video image is divided into domain blocks which are larger than the range blocks and allowed to overlap, and a search for a transform linear equation corresponding to the fixed points is performed. In this way, rather than compressing the image data itself, the fractal video image compression method compresses the image made up by the transform linear equation. A conventional fractal video image compression circuit and method, as disclosed in U.S. Pat. Nos. 5,384,867 and 5,430,812, includes a controller which receives image data to process the image data into blocks, such as range blocks and domain blocks, and supplies the processed data to a plurality of transform circuits and feed circuits. Each transform circuit receives data from the controller and a feed circuit, and compares blocks through a parallel process to generate a fractal transform value in which the image data is expressed in a compressed form.

It is difficult, using conventional methods, to completely search for the video image using a video image data base, and therefore, in order to determine whether the video image data retrieved from the data base is appropriate for the desired image, it is necessary to use more video image data than the video image for which the search is to be made. As a result, the video image data retrieved from the video image data base must be restored into images, and pictures which are not necessarily required to determine whether the retrieved video image is appropriate for the desired video image are restored, which unnecessarily consumes a significant amount of time. Furthermore, adopting the complete restoration causes a considerable loss of time since it takes time for the retrieved video image data to be restored into a complete video image.

SUMMARY OF THE INVENTION

To solve the above problems, it is an object of the present invention to provide a video image searching method in which a video image is partially restored according to a predetermined video image restoring ratio, to thereby reduce the amount of searching time.

It is a further object of the present invention to provide a video image searching apparatus for performing the video image searching method.

Additional objects and advantages of the present invention will be set forth in part in the description which follows and, in part, will be obvious from the description, or may be learned by practice of the invention.

Accordingly, objects of the invention are achieved by a method of searching for a video image from a plurality of image data stored in a data base that includes searching and retrieving from the data base one of the stored image data similar to the image, partially restoring the one retrieved image data, and comparing and evaluating the partially restored one retrieved image data with the image.

In a preferred embodiment, the method includes determining an image restoring ratio of retrieved video image data, and extracting a dominant image element from the video image. The extracting step includes compressing the video image through transform linear equations, determining a frequency of generation of fixed points of the linear equations according to values of decision elements of a matrix in an equation from which the fixed points are generated, and extracting the dominant image element according to a desired probability. In the preferred embodiment, the one retrieved image data corresponds to the extracted dominant image element according to the determined image restoring ratio.

Further objects of the invention are achieved by an apparatus for searching for an image in which an image restoring ratio determination unit determines an image restoring ratio, and an image element extracting unit partially restores the image. An image restoring unit partially restores image data corresponding to the partially restored image, according to the image restoring ratio, and a comparing unit compares the restored image data and the image.

In the preferred embodiment, the image element extracting unit includes a compression unit that compresses the image using a transform linear equation, and a determining unit that determines a frequency of generation of fixed points of the transform linear equation according to values of decision elements of a matrix in an equation from which the fixed points are generated. An extracting unit extracts the partially restored image according to a desired probability such that the frequency of generation of the fixed points corresponds to the probability.

Further objects of the invention are achieved by an apparatus for searching for an image in which an image restoring ratio determination unit determines an image restoring ratio, and a dominant image element extracting unit extracts a dominant image element from the image, using fractal image compression. A search unit retrieves image data from an image data base corresponding to the extracted dominant image element. An image restoring unit partially restores the retrieved image data from the search unit according to the image restoring ratio, and a comparing unit compares the restored image data and the image.

In the preferred embodiment, the dominant image element extracting unit includes a compression unit that compresses the image using a transform linear equation, and a determining unit that determines a frequency of generation of fixed points of the transform linear equation, according to values of decision elements of a matrix in an equation from which the fixed points are generated. An extracting unit extracts the dominant image element according to a desired probability, such that the frequency of generation of the fixed points corresponds to the probability.

Further objects of the invention are achieved by an apparatus for searching an image from a plurality of image data stored in a data base that includes a search unit to search and retrieve from the data base one of the stored image data similar to the image. A restoring unit partially restores the one retrieved image data, and a comparator compares the partially restored one retrieved image data with the image.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
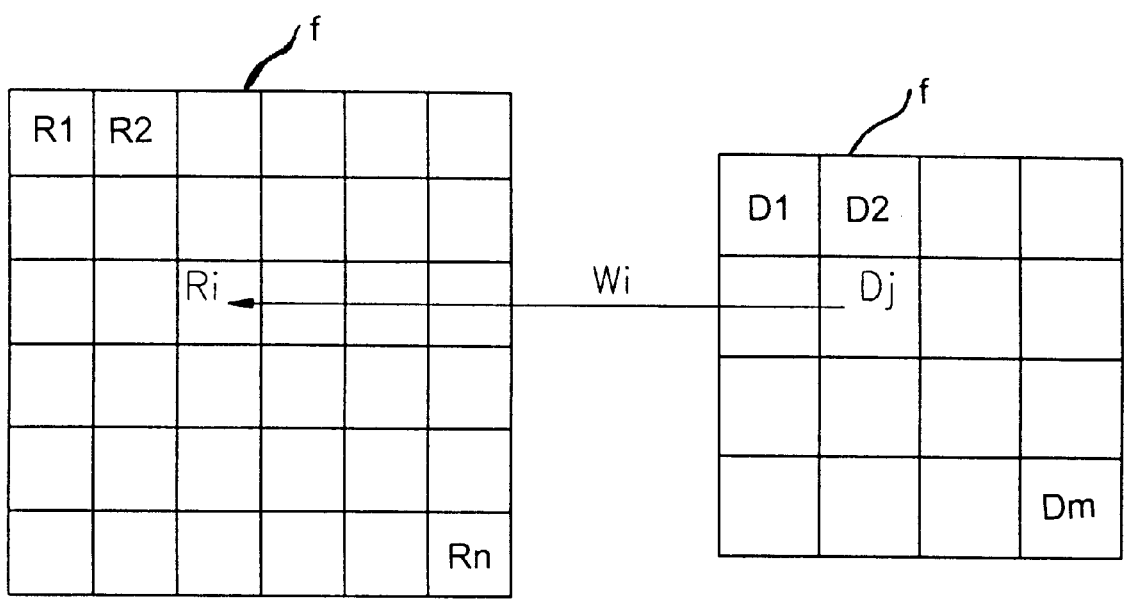
FIG. 1 shows a relationship between a range block and a domain block according to a preferred embodiment of the present invention.

As shown in FIG. 1, an image f is divided into a number of range blocks that includes R1, R2, ..., Ri, ..., Rn that are to be coded into a fractal image. At this time, image f=R1 U R2 U ... U Rn, and if i≠j, Ri∩Rj=0. Thus, the range blocks cover the image without overlapping. Also, image f is divided into domain blocks D1, D2, ..., Dj, ..., Dm, which are greater in size than each of the range blocks, and which may overlap. In a fractal compression method according to a preferred embodiment of the present invention, the video images are compressed into transform linear equations by searching for a domain block closest to each of the range blocks Ri through a transform linear equation. That is, given an arbitrary range block Ri, there is a search for a domain block Dj and an Affine transform linear equation Wi corresponding to the range block Ri, so that Ri=Wi (Dj), where Wi indicates the Affine transform linear equation as shown in Equation 1. In Equation 1, $a_i$, $b_i$, $c_i$, $d_i$, $e_i$, $f_i$ and $s_i$ are elements of the matrixes.

$$W_i \begin{pmatrix} \vdots \\ \vdots \\ \vdots \end{pmatrix} = \begin{pmatrix} a_i & b_i & 0 \\ c_i & d_i & 0 \\ 0 & 0 & s_i \end{pmatrix} \begin{pmatrix} \vdots \\ \vdots \\ \vdots \end{pmatrix} + \begin{pmatrix} e_i \\ f_i \\ 0 \end{pmatrix} \quad (1)$$

In Equation 1, the decision element of a 3×3 matrix determines the probability. That is, if {W1, W2, ..., Wm} are each substituted for Wi in Equation 1 to form a transform linear equation of an image, and if {A1, A2, ..., Am} indicates a 3×3 matrix of each of the equations and $\|A_i\|$ indicates the decision element of each matrix, the probability of the transform linear equation $W_i$ is $$\frac{\|A_i\|}{\sum_{k=1}^{m} \|A_k\|}.$$

That is, when $W_i$ is used, rather than regenerating the whole image, $$\frac{\|A_i\|}{\sum_{k=1}^{m} \|A_k\|}$$

of the whole image is regenerated, making the frequency of generation of fixed points correspond to, or equal to the probability. In this way, since there is no need to completely restore an image, the image is restored by the determined restoring ratio to compare the video images, thereby reducing the amount of searching time. As a result, less time is wasted compared to the conventional art which requires time to completely restore the retrieved image. In a preferred embodiment of the present invention, the probability is related to each element of the Affine transform linear equation, and the restoring ratio is the total probability, which includes various Affine transform equations.

Figure 2:
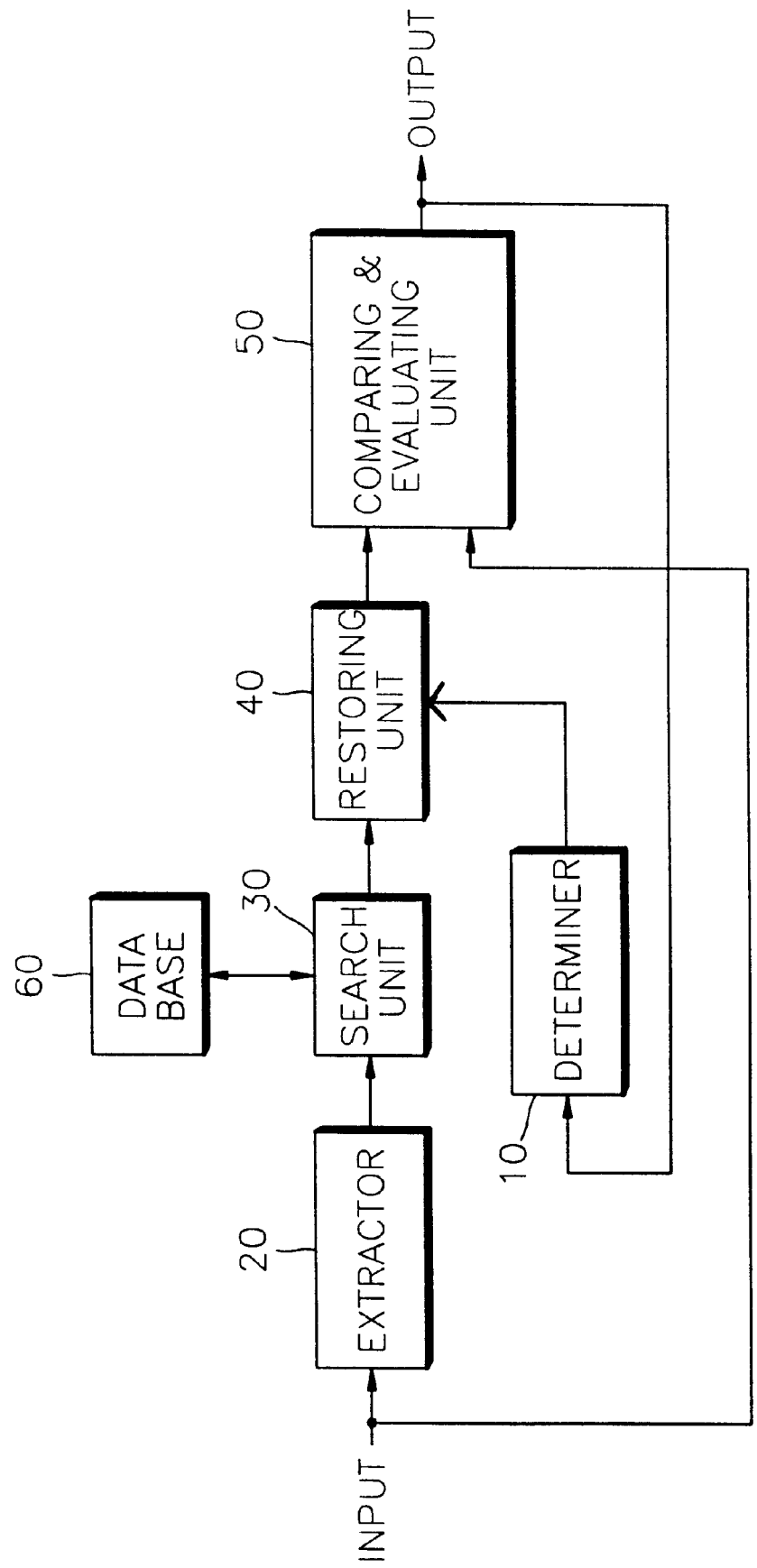
FIG. 2 is a block diagram of a video image searching apparatus according to the preferred embodiment of the present invention.

As illustrated in FIG. 2, an image searching apparatus according to a preferred embodiment of the present invention includes a function of controlling a restoring ratio according to a partial picture restoring method, to thereby shorten the total searching time. In FIG. 2, an image restoring ratio determiner 10 determines an image restoring ratio of the retrieved video image data, to partially restore the image. A dominant image element extractor 20 extracts a dominant image element from an image to be searched for, using a fractal image compression method. Here, the extraction of the dominant image element means the partial restoration of the image, to a degree capable of being used to search for the image. A search unit 30 searches for data similar to the extracted image compressed data, from a video image data base 60. An image restoring unit 40 partially restores the video image data retrieved from the data base 60, according to the predetermined image restoring ratio. A comparing and evaluating unit 50 compares the restored image with the image to be searched for and evaluates the images to generate a result of the video image search.

If the result is not a desired search result, the image restoring ratio is reset by the image restoring ratio determiner 10, and then the video image search is performed again. The dominant image element extractor 20 includes a compression unit for compressing the video image using linear equations, a determining unit for determining the frequency of generation of fixed points of the equations according to the values of the decision elements of the matrix in an equation from which the fixed points are generated, and an extracting unit for extracting a dominant image element according to a desired probability. The frequency of generation of the fixed points is equal to the desired probability.

Figure 3:
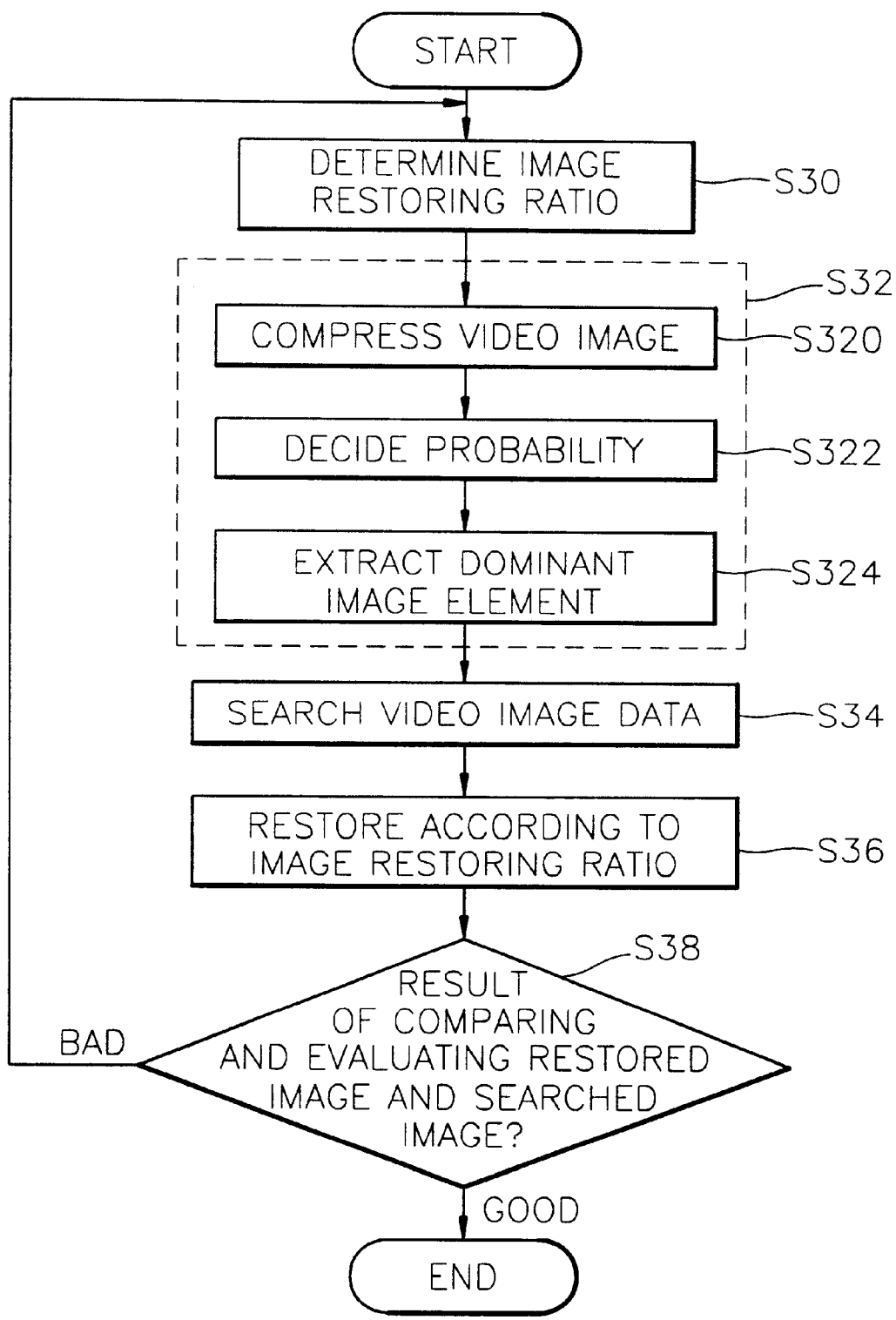
FIG. 3 is a flowchart illustrating a video image searching method according to the preferred embodiment of the present invention.

In FIG. 3, a method for searching for a video image according to the present invention includes the steps of determining an image restoring ratio of retrieved video image data (step S30), extracting a dominant image element of an image to be searched for, using a fractal image compression method (step S32), searching for data similar to the extracted image compressed data in a video image data base (step S34), partially restoring a video image of the retrieved video image data according to the determined image restoring ratio (step S36) and comparing and evaluating the partially restored video image and the video image to be searched for (step S38). If the result of comparing and evaluating the video images in step S38 is not good, the process returns to step S30 to increase the restoring ratio. The comparing and evaluating of the images in step S38 may be performed either visually by a user, or according to a method that makes use of artificial intelligence.

In a preferred embodiment of the present invention, the extracting of a dominant image element in step S32 includes the substeps of compressing the video image using transform linear equations (S320), deciding the frequency of generation of fixed points of the equations according to the values of decision elements of the matrix in an equation from which the fixed points are generated (S322) and extracting the dominant image elements based upon a desired probability (S324).

As described above, in the method and apparatus for searching for a video image according to the present invention, the searching time of the video image is shortened by partially restoring the picture according to a determined image restoring ratio, thereby reducing the time to completely restore a picture that is necessary in the conventional art. That is, in a preferred embodiment of the present invention, the dominant image element is extracted using a fractal image compression method so that the image is partially restored, to thereby effectively search for the video image.

Although a preferred embodiment of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to search an image from a plurality of image data stored in a data base, comprising:
   a search unit to search and retrieve from the data base one of the stored image data similar to the image;
   a restoring unit to partially restore the one retrieved image data;
   a comparator to compare the partially restored one retrieved image data with the image; and
   an image element extracting unit to extract a dominant image element from the image, the search unit searching the data base for image data similar to the extracted dominant image element, wherein the image element extracting unit further comprises:
      a compression unit to compress the image using a transform linear equation, and
      a determining unit to determine a frequency of generation of fixed points of the transform linear equation according to values of decision elements of a matrix in an equation from which the fixed points are generated, wherein the dominant image element is extracted from the image element extracting unit according to a desired probability, and the frequency of generation of the fixed points corresponds to the probability, and
   $\|A_i\|$ corresponds to the values of the decision elements so that a probability of a transform linear equation is $$\frac{\|A_i\|}{\sum_{k=1}^{m} \|A_k\|}, \text{ and } \frac{\|A_i\|}{\sum_{k=1}^{m} \|A_k\|}$$

of the image is regenerated.

2. A method to search for a video image from a plurality of image data stored in a data base, comprising:
   searching and retrieving from the data base one of the stored image data similar to the image;
   partially restoring the one retrieved image data;
   comparing and evaluating the partially restored one retrieved image data with the image;
   determining an image restoring ratio of retrieved video image data; and
   extracting a dominant image element from the video image, wherein one retrieved image data corresponding to the extracted dominant image element according to the determined image restoring ratio,
   wherein the extracting the dominant image further comprises:
      compressing the video image through transform linear equations,
      determining a frequency of generation of fixed points of the linear equations according to values of decision elements of a matrix in an equation from which the fixed points are generated, and
      extracting the dominant image element according to a desired probability, and $\|A_i\|$ corresponds to the values of the decision elements so that a probability of a transform linear equation is $$\frac{\|A_i\|}{\sum_{k=1}^{m} \|A_k\|}, \text{ and } \frac{\|A_i\|}{\sum_{k=1}^{m} \|A_k\|}$$

of the image is regenerated.

3. An apparatus for searching for an image, comprising:
   an image restoring ratio determination unit to determine an image restoring ratio;
   an image element extracting unit to partially restore the image;
   an image restoring unit to partially restore image data, corresponding to the partially restored image, according to the image restoring ratio; and
   a comparing unit to compare the partially restored image data and the image,
   wherein the image element extracting unit further comprises:
      a compression unit to compress the image using a transform linear equation,
      a determining unit to determine a frequency of generation of fixed points of the transform linear equation according to values of decision elements of a matrix in an equation from which the fixed points are generated, and
      an extracting unit to extract the partially restored image according to a desired probability, wherein the frequency of generation of the fixed points corresponds to the probability,
   wherein $\|A_i\|$ corresponds to the values of the decision elements so that a probability of a transform linear equation is $$\frac{\|A_i\|}{\sum_{k=1}^{m} \|A_k\|}, \text{ and } \frac{\|A_i\|}{\sum_{k=1}^{m} \|A_k\|}$$

of the image is regenerated.

4. An apparatus for searching for an image, comprising:
   an image restoring ratio determination unit to determine an image restoring ratio;
   a dominant image element extracting unit to extract a dominant image element from the image, using fractal image compression;
   an image data base to store image data;
   a search unit to retrieve the image data from the image data base corresponding to the extracted dominant image element;
   an image restoring unit to partially restore the retrieved image data from the search unit according to the image restoring ratio; and
   a comparing unit to compare the partially restored image data and the image, wherein the dominant image element extracting unit further comprises:
a compression unit to compress the image using transform linear equations,
a determining unit to determine a frequency of generation of fixed points of the transform linear equations according to values of decision elements of a matrix in an equation from which the fixed points are generated, and
an extracting unit to extract the dominant image element according to a desired probability, wherein the frequency of generation of the fixed points corresponds to the probability,
wherein $\|A_i\|$ corresponds to the values of the decision elements so that a probability of a transform linear equation is $$\frac{\|A_i\|}{\sum_{k=1}^{m}\|A_k\|}, \text{ and } \frac{\|A_i\|}{\sum_{k=1}^{m}\|A_k\|}$$

of the image is regenerated.

5. An apparatus for searching an image from a plurality of image data stored in a data base, comprising:
a search unit to search and retrieve from the data base one of the stored image data similar to the image;
an image restoring ratio determination unit to determine an image restoring ratio;
a restoring unit to partially restore the one retrieved image data in accordance with the image restoring ratio;
a comparator to compare the partially restored one retrieved image data with the image;
an image element extracting unit to extract a dominant image element from the image, wherein the search unit searches the data base for image data similar to the extracted dominant image element, the image element extracting unit comprising:
a compression unit to compress the image using a transform linear equation, and
a determining unit to determine a frequency of generation of fixed points of the transform linear equation according to values of decision elements of a matrix in an equation from which the fixed points are generated, wherein the dominant image element is extracted from the image element extracting unit according to a desired probability, and the frequency of generation of the fixed points corresponds to the probability,
wherein $\|A_i\|$ corresponds to the values of the decision elements so that a probability of a transform linear equation is $$\frac{\|A_i\|}{\sum_{k=1}^{m}\|A_k\|}, \text{ and } \frac{\|A_i\|}{\sum_{k=1}^{m}\|A_k\|}$$

of the image is regenerated.

6. A method of searching for a video image from a plurality of image data stored in a data base, comprising:
searching and retrieving from the data base one of the stored image data similar to the image;
determining an image restoring ratio of retrieved video image data;
partially restoring the one retrieved image data in accordance with the image restoring ratio;
comparing and evaluating the partially restored one retrieved image data with the image; and
extracting a dominant image element from the video image, wherein the one retrieved image data corresponds to the extracted dominant image element according to the determined image restoring ratio, comprising:
compressing the video image through transform linear equations,
determining a frequency of generation of fixed points of the linear equations according to values of decision elements of a matrix in an equation from which the fixed points are generated, and
extracting the dominant image element according to a desired probability,
wherein $\|A_i\|$ corresponds to the values of the decision elements so that a probability of a transform linear equation is $$\frac{\|A_i\|}{\sum_{k=1}^{m}\|A_k\|}, \text{ and } \frac{\|A_i\|}{\sum_{k=1}^{m}\|A_k\|}$$

of the image is regenerated.

7. An apparatus according to claim 3, further comprising:
an image data base to store the image data; and
a search unit to retrieve the image data from the image data base corresponding to the partially restored image.

8. An apparatus according to claim 3, wherein the comparing unit generates a result, and the image restoring ratio determination unit adjusts the image restoring ratio when the result is not a desired result.

9. An apparatus according to claim 4, wherein the comparing unit generates a result, and the image restoring ratio determination unit adjusts the image restoring ratio when the result is not a desired result.

10. An apparatus according to claim 5, wherein the comparator generates a result and the image restoring ratio determination unit adjusts the image restoring ratio when the result is not a desired result.

11. The method according to claim 6, wherein the step of comparing and evaluating generates a result, and the method is repeated with the determining step determining an alternate image restoring ratio when the result is not a desired result.

* * * * *